United States Patent Office 3,086,908
Patented Apr. 23, 1963

3,086,908
FUNGICIDAL COPPER SPRAYS
Otto Telle and Ferdinand Grewe, Cologne-Stammheim, Germany, assignors to Farbenfabriken Bayer Aktiengesellschaft, Leverkusen, Germany, a corporation of Germany
No Drawing. Filed May 27, 1958, Ser. No. 738,017
Claims priority, application Germany June 7, 1957
6 Claims. (Cl. 167—42)

The present invention relates to and has as its objects new and useful fungicidal copper spray compositions.

Instead of the copper sulphate-lime liquor, the so-called Bordelaise or Bordeaux liquor, the manufacture of which is cumbersome and which can only be used in the fresh state, various "insoluble" copper complex compounds and also oxygen compounds of copper such as copper oxychloride, basic copper sulphates, basic copper carbonates or cuprous oxide have been used in practice for a long time as fungicides for plant protection. Compared with the Bordeaux liquor, these compounds have the advantage that the user can produce the (aqueous) liquor ready for spraying in a simple manner and that they are generally more compatible with plants than the Bordeaux liquor. However, their disadvantage consists in that they have a reduced fungicidal action when used in the same amount of copper and that the spray coats produced on the plants to be protected are less rainproof than those of the Bordeaux liquor. As a result, the period of action of these copper preparations in the field is shorter than that of the same amount of copper in the form of the Bordeaux liquor.

With the recently increasing use of water-saving sprayers and of aircraft for plant protection difficulty arises with the application of the class of copper preparations used at present, since liquors cannot be discharged without interference at the high concentrations required by these apparatus. In regions where the supply of the quantities of water required for spraying encounters special difficulties, plant-compatible oils have more recently been used as carried substances for the discharge of the fungicides. The fastness to rain of the spray coats is thus considerably increased at the same time. However, the copper preparations produced in the hitherto usual manner cannot be satisfactorily dispersed in the oils suitable for this application so that the desired fungicidal effect cannot be achieved or only incompletely.

A number of methods are known for the improvement of the fungicidal action and increase of the fastness to rain of the spray coats obtained with these copper preparations:

(1) Reduction of the particle size: the fungicidal action is to a large extent a function of the particle size, i.e. the fungicidal action increases with decreasing particle size of the "insoluble" copper salts.

(2) Addition of adhesives: it is chiefly the resistance to leaching by rain which may be improved by the addition of so-called adhesives or stickers. Numerous substances of various types (e.g. gelatinous substances, methyl-cellulose, tylose, polyhydric alcohols) have already been proposed and used for this purpose.

However, all hitherto known suggestions for increasing the fungicidal action and improving the resistance to leaching by rain of copper preparations have not yet led to a practically satisfactory result.

In the case of copper oxychloride, for example, a greater fineness of particle size can only be achieved by careful precipitation, the temperatures prevailing during the precipitation and the copper concentration of the mother liquor subjected to precipitation being of particular importance. By observing optimum conditions during precipitation a substantial increase both in the time required for the precipitation and in the volume of the reaction vessels is involved.

The separation of the fine particles from the mother liquor and the drying of such preparations in such a manner that they do not conglomerate when re-introduced into water and that the primary grain is conserved, also involve considerable expense. For this reason the manufacture of Cu oxychloride preparations having, for example, very fine particles at a price tolerable for practical plant protection has hitherto not been possible.

Attempts have also been made to obviate the risk of damaging the grain when drying finely grained preparations by producing the preparations in the form of pastes. In practice however, such pasty preparations have a number of disadvantages the most marked of which is the necessary use of air-tight packages and the rapid deterioration of the quality of opened packages caused by evaporation of water.

Another interfering disadvantage of very finely grained copper preparations (particle size less than 1 micron) is the increase in plant-damaging properties with decreasing particle size. Thus, an important advantage of these preparations is lost again.

Likewise, all hitherto proposed substances for increasing the resistance to leaching by rain have either not led to the desired effect in a satisfactory manner or else fixed the spray coats to the green organs of the plants to be protected to such an extent as to render a redistribution on the sprayed plant organs by rain-water impossible. A complete fixation of the spray patches is however undesirable, since in this case the surfaces of the growing surfaces of the green organs can only be protected from infestation with fungi by very frequent renewed spraying, whilst the active substance stored in the old spray patches remains unused.

Thus it is an object of the present invention to provide new fungicidal copper spray compositions. Another object is the preparation of such copper spray compositions with higher activity than hitherto known. A special object is the preparation of copper sprays with outstanding high fungicidal activity and resistance to rain-leaching. Still further objects will become apparent as the following description proceeds.

It has now been found that fungicidal copper preparations of surprisingly high activity and a resistance to rain leaching are obtainable by using instead of the strongly hydrophilic auxiliaries hitherto chiefly used such as cell-pitch (sulphite waste liquor), tylose (methyl cellulose) or similar substances, a mixture of an emulsifier consisting of a polyglycol ether or a glycerol-fatty acid ester, containing at least of one free OH group in the glycerol part of the molecule with metal salts of fatty acids.

The above mentioned polyglycol ethers may be an aryloxypolyglycol ether such as the reaction product of ethylene oxide or propylene oxide or mixtures thereof with phenol, the different cresols, and the like, hydroxy diphenyls (especially o- or p-hydroxydiphenyl), with benzyl hydroxydiphenyl, and the like. Especially advantageous are fatty alcohol polyglycol ethers such as the reaction products of $C_8$ to $C_{25}$ alcohols especially $C_{12}$ to $C_{18}$ alcohols with ethylene oxide or propylene oxide or mixtures thereof. Those reaction products are e.g. lauryl, stearyl, palmityl or oleyl polyglycol ethers. Under polyglycol ethers there is to be understood a reaction product containing more than at least 2 glycol radicals in the molecule and usually not more than about 50 glycol radicals. most suitable are the commercially available polyglycol ethers containing in average between about 8 to 20 glycol radicals. The fatty acid glycerol esters as above mentioned should contain at least one unesterified OH-group. As examples there may be mentioned the lauric acidglycerol-mono- and -diesters, the palmitic acid-glycerol-mono- and -diesters, the stearic acid-glyceroldiester (Emocithin) and the like.

Metal salts of fatty acids in the meaning of the above-said are e.g. the sodium, potassium, zinc, magnesium, manganese, iron or copper salts of lauric acid, stearic acid, palmitic acid, margaric acid, oleic acid, linoleic acid and the like.

When using these auxiliaries, the particle diameter of the copper compounds may have the same size as in hitherto customary preparations 0.5–10, especially 1–2 microns.

Copper compounds in the meaning of the present invention are especially copper oxides or copper salts such as $Cu_2O$, $Cu(OH)_2$, $CuCl_2$, $CuSO_4$, $CuCO_3$, also basic copper salts are copper compounds in the meaning of this invention. Examples of those compounds are e.g. $Cu(OH)_2 x CuCl_2$, $[3Cu(OH)_2]xCuCl_2$, $Cu(OH)_2 x CuSO_4$ as well as the various hydrates of those salts, and the like. Also other $CuCl_2$, $CuSO_4$, basic copper carbonate and the like. Also other complex salts containing copper are well within the scope of this invention. Examples of such copper other metal complexes are e.g. $Cu(OH)_2 x CaCl_2$ (or $ZnCl_2$ or $MgCl_2$). At last also mixtures of the above said copper salts or complexes with other metal salts such as zinc-phosphate, zinc sulfate, zinc carbonate, zinc oxide, zinc sulphide, magnesium carbonate and the like, are to be considered as copper salts in the meaning of this invention.

In the following some inventive mixtures are given without, however, restricting this invention in any way:

85.7% of $[3Cu(OH)_2 xCuCl_2]$ (=50% copper metal)
4% of Emocithin (stearic-acid-diglyceride)
2.4% of Mg-stearate
7.9% of "Vulkasil C" (=colloidal silicic acid, α-synth. product)

85.7% $[Cu(OH)_2 xCuCl_2]$ (=50% of copper metal)
4.3% of oleylpolyglycolether
2% of magnesium-stearate
8.0% of colloidal-kaoline+"Vulkasil C" (expl. see above 50:50)

85.7% $[Cu(OH)_2 xCuCl_2]$ (=50% of copper metal)
4.3% of cetylpolyglycolether
2% of titanium stearate
8.0% of colloidal-kaoline+"Vulkasil C" (50:50)

85.7% $[Cu(OH)_2 xCuCl_2]$ (=50% of copper metal)
4.3% oleylpolyglycolether
2% of aluminium-stearate
8.0% of "Silitin Z" (=almost pure natural occurring silicic acid)+"Vulkasil C" (50:50)

69% of $[4Cl(OH)_2 xCaCl_2]$ (=35% of copper metal)
6% of oleylpolyglycolether
3% of magnesium stearate
22% of "Silitin Z"+"Vulkasil C" (50:50)

The powders of copper compounds obtainable according to the invention are dispersible both in water and in oil and can be sprayed in both media by means of any sprayers of "high volume" or "low volume" liquid consumption without interference.

For the possible ways of obtaining powdered preparations of the said copper compounds by way of copper oxychloride the following methods may be used, but should not be considered restricting also.

Addition of the auxiliaries to the wet copper oxychloride pastes may be carried out immediately after precipitation and subsequent drying of the mixture by a suitable method, e.g. by a spray drier. In this case, amounts of between 2–20%, especially 6 and 11% of the auxiliaries, preferably 4% of oleyl polyglycol ether and 2% of magnesium stearate, referred to the dry mass, should be used.

Another way consists in drying of the pure copper oxychloride and addition of the auxiliaries with intimate mixing and/or grinding of the whole mixture. When working up in this way also 2–20% but especially 4 to 8% of auxiliaries, preferably 4% of oleylpolyglycol ether and 2% of magnesium stearate, referred to the dry mass, are sufficient.

Copper preparations produced in this way are very well tolerated by plants and, while having a resistance to rain-leaching, they are sufficiently redistributable from the spray patches on the sprayed plant organs. In the dry state they can be stored practically indefinitely without special demands as to the air-tightness of the packages. Aqueous liquors made from such preparations remain useful for a long time and can be re-employed after simple stirring without a decrease in efficacy. They can also be used in mixtures with other fungicides and/or insecticides of known types.

The copper preparations in the meaning of the present invention may contain up to 70% of copper (calculated as metal). In this case almost pure $Cu_2O$ is used in combination with the inventive ingredients. Copper preparations with a content of less than 5% copper (calculated as metal) are less important and may be disregarded in the meaning of this invention. Usually a composition containing 25–50% of copper (calculated as metal) in the dry composition are most advantageous.

The inventive copper sprays may be used advantageously in the same fields as other copper sprays, i.e. preferably against such pests as *Phythophthora infestans* and *Alternaria solani* (potatoes and tomatoes), *Plasmopera viticola* (vine), *Cercospora beticola* (beets) and *Cercospora musae* (bananas), and other "downy mildews" and leaf spot diseases, which are controlled hitherto by copper compounds.

The very useful physical and fungitoxic properties of copper preparations as described above can be seen from the following results of tests made with copper oxychloride as an example.

EXAMPLE

In all the tests listed below three preparations were used:

Preparation A: copper oxychloride powder prepared with hydrophilic auxiliaries in a conventional manner: 50% of copper=85.7% of $[3Cu(OH)_2xCuCl_2]$, average particle size: 1–2 microns, other ingredient: sulfite lye.

Preparation B: so-called colloidal copper oxychloride in a powdered form: 50% of copper=85.7%

$$[3Cu(OH)_2xCuCl_2]$$

particle size: all particles less than 1 micron, other ingredient: tylose (methyl cellulose).

Preparation C: copper oxychloride powder prepared according to the invention. 50% of copper=85.7% $[3Cu(OH)_2xCuCl_2]$, particle size as in Preparation A, 4.3% of oleylpolyglycol ether, 2% of magnesium stearate, 8.0% of "Vulkasil C" (=synthetic colloidal $SiO_2$, +Silitin Z

(1) *Suspension Power and Adhesiveness in Vitro*

(*a*) *Suspension power*.—Aqueous liquors are filled into 1000-millilitre glass cylinders and vigorously shaken. After standing for 30 minutes, the upper 9⁄10 of the volume are siphoned off and the solids content of the residual 1⁄10 is ascertained.

| Preparation | Concentration of the liquor in percent of copper | Deposit after 30 minutes, percent |
|---|---|---|
| A | 0.25 | 13–25 |
| C | 0.25 | 12 |

(b) *Adhesiveness and resistance to rain-leaching.*—Equal volumes of liquors having the same copper content are placed on completely degreased glass plates of equal size. After drying at the same temperature and relative atmospheric moisture, the plates are either immersed in water for a definite time or artificially irrigated with a rain apparatus (aqua dest.). The loss of total substance incurred by this treatment is then ascertained.

| Preparation | Concentration of liquor in percent of copper | Percent of dry substance washed off after— | |
|---|---|---|---|
| | | immersion | irrigation |
| A | 0.25 | 30-60 | 40-90 |
| C | 0.25 | 20.8 | 24.1 |

(2) *Fungicidal Action and Resistance to Rain-Leaching in Vivo*

The tests were carried out with tomato plants which had recently been artificially infested with the fungus *Phytophthora infestans*. The preparations were always sprayed with the same amount of liquor (600 litres per ha.) and dried under the same conditions. 24 hours after spraying, the plants to be exposed to rain were irrigated on a turn-table from two nozzles at a sharp angle from the front and vertically from above. Within 8 minutes, 3.3 litres of aqua dest. were sprayed onto 4 plants. After the irrigation, the plants dried for 24 hours and were then infested with a zoosporangia suspension and incubated at a relative atmospheric moisture of 100 percent and 18 to 20° C. The evaluation took place on the sixth day after the infestation. The infestation was indicated in percentages of the infestation of untreated control plants whose infestation equalled 100. In the following Test No. 2 the conditions were intensified insofar as after drying of the spray coat and before irrigation by rain, the plants to be exposed to rain were placed over night into a moist cell at a relative atmospheric moisture of 100 percent, thus "pre-softening" the spray coats.

TEST 1

| Preparation | Amount of copper, kg./ha. | Degree of infestation | | Efficacy loss in percent after rain |
|---|---|---|---|---|
| | | without rain | with rain | |
| A | 3.0 | 40 | 45 | 12.5 |
| | 1.5 | 49 | 58 | 18.3 |
| B | 1.5 | 39 | 47 | 20.5 |
| | 0.75 | 39 | 51 | 30.7 |
| C | 1.5 | 40 | 40 | 0 |
| | 0.75 | 42 | 41 | 0 |
| Untreated control | | 100 | 100 | |

TEST 2

[Spray coats "pre-softened" before irrigation]

| Preparation | Amount of copper, kg./ha. | Degree of infestation | | Efficacy loss in percent after rain |
|---|---|---|---|---|
| | | without rain | with rain | |
| A | 3.0 | 34 | 56 | 64.7 |
| | 1.5 | 44 | 52 | 18.2 |
| | 0.75 | 49 | 60 | 22.4 |
| B | 1.5 | 32 | 40 | 25 |
| | 0.75 | 43 | 49 | 14 |
| C | 1.5 | 32 | 32 | 0 |
| | 0.75 | 37 | 39 | 5.4 |
| Untreated control | | 100 | 100 | |

We claim:
1. Fungicidal copper sprays containing a mixture of
    (A) a fatty alcohol polyglycol ether,
    (B) a fatty acid metal salt, and
    (C) a fungicidal copper compound with a copper content (referred to metallic copper) from 5 to 70%.
2. Fungicidal copper sprays containing a mixture of
    (A) a fatty alcohol polyglycol ether,
    (B) a fatty acid metal salt, and
    (C) a fungicidal copper compound with a copper content (calculated as metal) of 25 to 50%.
3. Fungicidal copper sprays containing a mixture of
    (A) an oleyl polyglycol ether,
    (B) a magnesium stearate, and
    (C) a fungicidal copper compound with a copper content (calculated as metal) of 25 to 50%.
4. Fungicidal copper sprays containing a mixture of
    (A) an oleyl polyglycol ether,
    (B) an aluminium stearate, and
    (C) a fungicidal copper compound with a copper content (calculated as metal) of 25 to 50%.
5. Fungicidal copper sprays containing a mixture of
    (A) a stearyl polyglycol ether,
    (B) a magnesium stearate, and
    (C) a fungicidal copper compound with a copper content (calculated as metal) of 25 to 50%.
6. Fungicidal copper sprays containing a mixture of
    (A) a cetyl polyglycol ether,
    (B) a titanium stearate, and
    (C) a fungicidal copper compound with a copper content (calculated as metal) of 25 to 50%.

References Cited in the file of this patent

UNITED STATES PATENTS

| | | |
|---|---|---|
| 1,826,065 | Fulton et al. | Oct. 6, 1931 |
| 1,853,397 | Banks | Apr. 12, 1932 |
| 1,866,069 | Wilcoxon | July 5, 1932 |
| 1,875,999 | Gerlach | Sept. 6, 1932 |
| 2,237,045 | Booth et al. | Apr. 1, 1941 |
| 2,337,466 | Herbert | Dec. 21, 1943 |
| 2,465,470 | Omohundro et al. | Mar. 29, 1949 |
| 2,637,661 | Benignus | May 5, 1953 |
| 2,824,825 | Fath et al. | Feb. 25, 1958 |
| 2,907,691 | Hartley et al. | Oct. 6, 1959 |